UNITED STATES PATENT OFFICE.

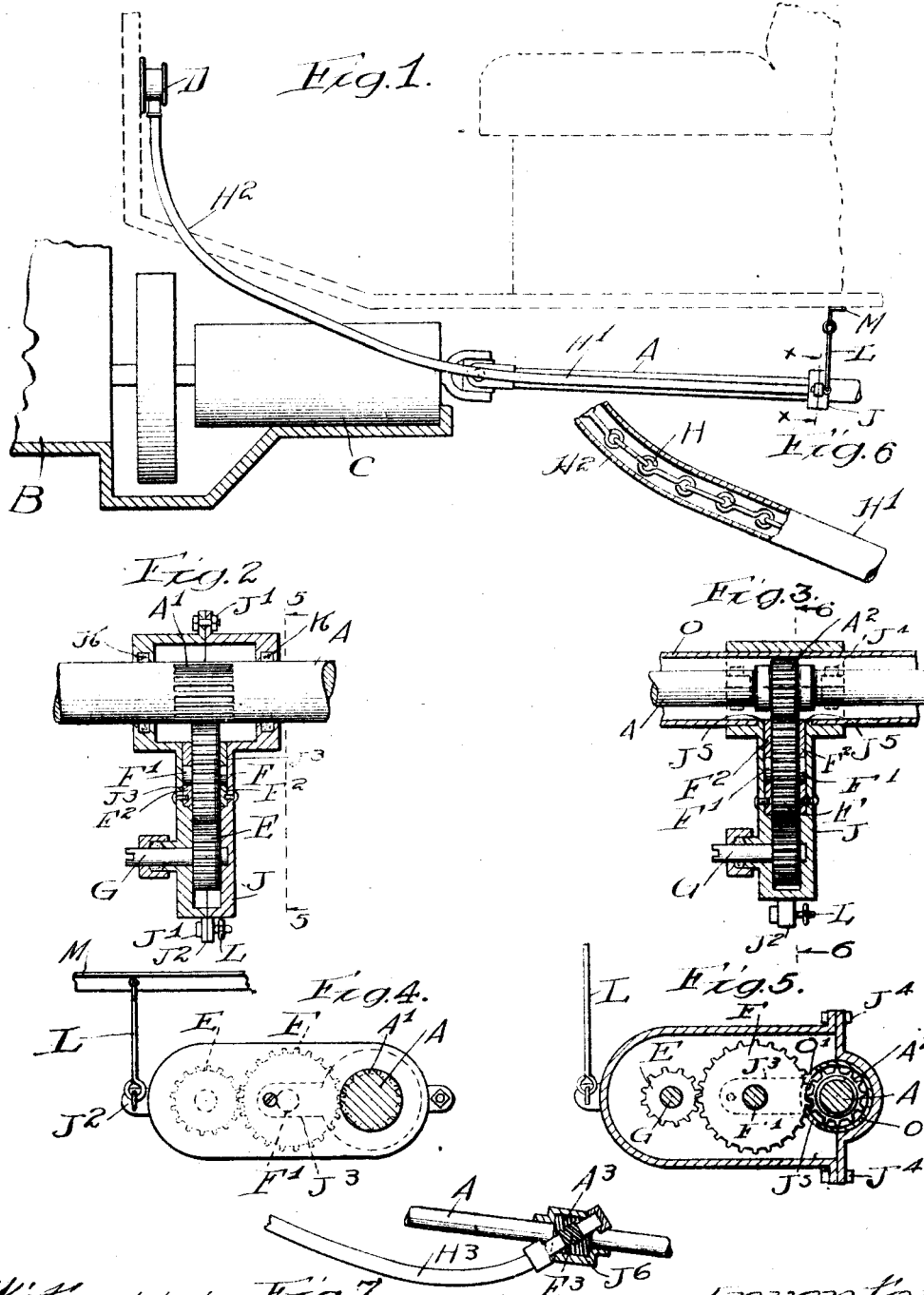

JOHN K. STEWART, OF CHICAGO, ILLINOIS, ASSIGNOR TO STEWART-WARNER SPEEDOMETER CORPORATION, OF VIRGINIA.

SPEEDOMETER-DRIVE GEAR.

1,182,051.  Specification of Letters Patent.  Patented May 9, 1916.

Application filed September 17, 1912. Serial No. 720,767.

*To all whom it may concern:*

Be it known that I, JOHN K. STEWART, a citizen of the United States, residing at Chicago, in the county of Cook and State of Illinois, have invented new and useful Improvements in Speedometer-Drive Gear, of which the following is a specification, reference being had to the accompanying drawings, forming a part thereof.

The purpose of this invention is to provide an improved drive connection for speedometers when used on automobiles or similarly constructed self-propelled vehicles.

It consists of the features and elements described and shown in the drawings as indicated in the claims.

In the drawings:—Figure 1 is a side elevation showing the mode of installation of the speedometer drive embodying this invention, the relative position of certain parts of the automobile being indicated in dotted lines. Fig. 2 and 3 are sectional detail views taken as indicated at line $x-x$ on Fig. 1 and showing, respectively, two alternative forms of the drive gearing and casing therefor. Fig. 4 is a detail view partly in section taken as indicated at line 5—5 on Fig. 2. Fig. 5 is a detail section taken as indicated at line 6—6 on Fig. 4. Fig. 6 is a sectional detail of the transmission shaft, H, showing the use of the jointed or flexible shafting within the curved portion of the tube, H¹. Fig. 7 is a sectional detail of a modified form of connection to the propeller shaft comprising spiral gears.

In Fig. 1, A, indicates the propeller drive shaft which is now almost universally employed as an element of the power transmission of an automobile, the position of the motor and change gear being indicated at B and C, respectively.

It is the object of this invention to provide a suitable form of gearing for connecting the speedometer, D, which is to measure the speed of the car directly to the propeller shaft, A, instead of to one of the road wheels as is more commonly done. Referring first to Fig. 2, this may be arranged by milling gear teeth in the propeller shaft, A, as indicated at, A¹, and providing a train of plain spur gears for transmitting the motion of this shaft, A, to the speedometer. As shown, this train consists of a driven gear, E, and an idler gear, F, connecting it with the gear, A¹, of the shaft, A. The gear, E, has rigid with it a short spindle, G, designed for connection with the speedometer drive shaft, H, which is preferably a flexible or jointed shaft and extends in a sweeping curve from the spindle, G, to the speedometer head, D, mounted on the dashboard of the vehicle or in any similarly convenient position with respect to the driver's seat. Since the position of the propeller shaft, A, relative to the frame of the vehicle is but slightly varied with the vertical movement of the road wheels in passing over obstructions in the road, the shaft, H, need not be entirely of jointed construction, and if inclosed merely in a plain tube, H¹, instead of in the full coiled flexible tubing, the spring of such tube, H¹, will be sufficient to accommodate the slight movement of the propeller shaft, A, and the drive shaft, H, need be jointed only throughout the curved portion of the tubing, H¹, as indicated at H², in Fig. 7.

Referring again to Fig. 2, there is here shown a housing, J, provided for the gear train which is designed to be split transaxially with respect to the shaft, A, the two halves being bolted together as at, J¹. It will be understood that the shaft, A, turns in the housing, J, said housing being slipped on to the shaft when the latter is assembled, and to render the housing practically air-tight so that it may serve as an oil reservoir for the gearing it is provided with felt washers or similar packing, K, at the points of emergence of the shaft, A. To support the outer end of the casing, J, any convenient form of hanger, L, may be employed somewhat loosely connected at one end to the lug, J², and at the other end to a member of the vehicle frame, M, so as to permit such slight displacement of the casing, J, as is effected by the rising and falling of the propeller shaft, A, above referred to.

To adapt the gear train for use on cars having different sizes of road wheels it is necessary that provision be made for changing the ratio between the gears A¹ and E. To permit this the axle, F¹, of the idler, F, is accommodated in slots, J³, formed in either side of the casing, J, and extending in the direction of the line of centers of the gears, A¹ and E; thus, if the gear, E, is to be replaced by one of different size, a new idler gear, F, of the proper diameter to fill the interval may be substituted for the original idler, F, and its axle will be accommodated at any necessay position in the slots, J³. If desired, the position of such axle, F¹, may be definitely fixed by the use of filler blocks, F², which would be furnished with each size of idler, F, for filling out the slots, J³, at each side of the axle, F¹, thus preventing improper meshing of the idler, F, with either of the other gears.

Fig. 3 indicates a special construction designed for application to cars in which the propeller shaft, A, is inclosed in an oil-tight tubular casing, O. In this case the housing, J, is arranged to be split along a vertical plane passing through the axis of the shaft, A, as is more clearly indicated in Fig. 6. The clamping bolts, J⁴, thus serve to clamp the housing, J, firmly upon the case, O, and render it practically integral therewith. The idler gear, F, is intruded through a circumferentially extending slot, O¹, to mesh with the gear A² of the propeller shaft, A. For definitely locating the housing, J, with respect to this slot, the slots of the housing are extended in the form of lugs, J⁵, which extend into and abut the ends of the slot, O¹, and thus positively prevent the housing, J, from turning upon the casing, O, although if it is desired that the weight of the housing, J, shall not exert a torsional strain on the tube, O, a hanger, L, may be provided as in the other form of the device illustrated in Fig. 2.

Still another form of connection to the propeller shaft, A, is shown in Fig. 7, in which the shaft is provided with a worm or spiral gear, A³, and a second spiral gear, E³, is journaled in the special form of housing, J⁶, so as to mesh with the gear, A³. The second gear, E³, is connected directly with the transmission shaft, H³, which extends to the speedometer in substantially the same manner as the shaft, H, indicated in Fig. 1. It will be evident that this construction makes a more compact form of drive connection than those above described, and changes in ratio between the gears, A³ and E³, will be made by substituting for both gears a different pair of different pitch.

I claim:—

1. In an automobile, in combination with a power-transmitting shaft provided with a gear and a tubular casing for the shaft which incloses the gear thereon, a gear housing secured to said tubular casing and extending off therefrom transversely with respect to the shaft, said casing having a circumferentially extending slot at the plane transverse to the shaft at which the gear thereon is located, a gear journaled in said housing and extending through said slot to mesh with said gear on the propeller shaft, and a power transmitting shaft operatively connected with said gear in the housing leading off laterally from the housing.

2. In an automobile, in combination with a power-transmitting shaft provided with a gear and a tubular casing encompassing the shaft and its gear, a gear housing secured to said tubular casing and extending off therefrom transversely with respect to the shaft, said casing having a circumferentially extending slot in the plane transverse to the shaft in which the gear on the shaft is located, a gear journaled in said housing and extending through said slot to mesh with said gear on the propeller shaft, a power-transmitting shaft operatively connected with said gear in the housing and extending off laterally from the housing, said housing being provided with lugs engaging the opposite ends of the slot of the casing for definitely positioning the gear housing on the shaft-casing and stopping it against movement circumferentially with respect to the shaft.

In testimony whereof I have hereunto set my hand at Chicago, Illinois, this 11th day of September, 1912.

JOHN K. STEWART.

Witnesses:
ROBT. N. BURTON,
EDNA M. MACINTOSH.